United States Patent
Milke et al.

(10) Patent No.: US 11,177,059 B2
(45) Date of Patent: Nov. 16, 2021

(54) FILM RESISTOR AND THIN-FILM SENSOR

(71) Applicant: TDK Electronics AG, Munich (DE)

(72) Inventors: Bettina Milke, Berlin (DE); Bernhard Ostrick, Teltow (DE)

(73) Assignee: TDK ELECTRONICS AG, Munich (DE)

(*) Notice: Subject to any disclaimer, the term of this patent is extended or adjusted under 35 U.S.C. 154(b) by 268 days.

(21) Appl. No.: 16/603,809

(22) PCT Filed: Apr. 12, 2018

(86) PCT No.: PCT/EP2018/059433
§ 371 (c)(1),
(2) Date: Oct. 8, 2019

(87) PCT Pub. No.: WO2018/192837
PCT Pub. Date: Oct. 25, 2018

(65) Prior Publication Data
US 2020/0118721 A1 Apr. 16, 2020

(30) Foreign Application Priority Data
Apr. 21, 2017 (DE) .......................... 102017108582.3

(51) Int. Cl.
H01C 17/075 (2006.01)
G01B 7/16 (2006.01)
(Continued)

(52) U.S. Cl.
CPC ............. *H01C 17/075* (2013.01); *G01B 7/18* (2013.01); *G01L 1/18* (2013.01); *G01L 1/2281* (2013.01); *H01C 10/10* (2013.01)

(58) Field of Classification Search
CPC ........ H01C 17/075; H01C 10/10; G01B 7/18; G01L 1/18; G01L 1/2281
See application file for complete search history.

(56) References Cited

U.S. PATENT DOCUMENTS 3,451,030 A 6/1969 Garfinkel
4,028,276 A 6/1977 Harden et al.
(Continued)

FOREIGN PATENT DOCUMENTS

CN 87215217 U 8/1988
CN 1116594 C 7/2003
(Continued)

OTHER PUBLICATIONS

Antonov, M. et al., "Chromium Carbide Based Cermets as the Wear Resistant Materials," 4th International Conference, "Industrial Engineering—Innovation as Competetive Edge for SME," Apr. 29-30, 2004, 4 pages.
(Continued)

*Primary Examiner* — Kyung S Lee
(74) *Attorney, Agent, or Firm* — Slater Matsil, LLP

(57) ABSTRACT

A film resistor and a film sensor are disclosed. In an embodiment a film resistor includes a piezoresistive layer comprising a $M_{1+n}AX_n$ phase, wherein M comprises at least one transition metal, A comprises a main-group element, and X comprises carbon and/or nitrogen, and wherein n=1, 2 or 3.

15 Claims, 1 Drawing Sheet

(51) Int. Cl.
  *G01L 1/18* (2006.01)
  *G01L 1/22* (2006.01)
  *H01C 10/10* (2006.01)

(56) References Cited

U.S. PATENT DOCUMENTS

| | | | |
|---|---|---|---|
| 4,651,120 | A | 3/1987 | Aagard |
| 6,981,410 | B2 * | 1/2006 | Seki ............... G01F 1/6845 |
| | | | 73/204.26 |
| 7,181,963 | B2 * | 2/2007 | Bork ............... A61B 5/028 |
| | | | 73/204.26 |
| 7,667,569 | B2 | 2/2010 | Iseki et al. |
| 7,854,173 | B2 | 12/2010 | Cheng et al. |
| 7,892,599 | B2 | 2/2011 | Yadav et al. |
| 8,198,978 | B2 * | 6/2012 | Schultes ............ H01C 7/04 |
| | | | 338/223 |
| 8,568,027 | B2 * | 10/2013 | Ivanov ............. G01L 1/20 |
| | | | 374/185 |
| 8,890,649 | B2 | 11/2014 | Saitou et al. |
| 9,618,406 | B2 | 4/2017 | Kroeger et al. |
| 2001/0020694 | A1 | 9/2001 | Makino et al. |
| 2004/0074306 | A1 | 4/2004 | Kinoshita et al. |
| 2005/0211214 | A1 | 9/2005 | Tomita et al. |
| 2006/0087399 | A1 | 4/2006 | Barge et al. |
| 2009/0013801 | A1 | 1/2009 | Yamashita et al. |
| 2009/0078040 | A1 | 3/2009 | Ike et al. |
| 2010/0116808 | A1 | 5/2010 | Wang |
| 2013/0015537 | A1 | 1/2013 | Nowak et al. |
| 2015/0325345 | A1 | 11/2015 | Fujita et al. |
| 2016/0123828 | A1 | 5/2016 | Matzen |

FOREIGN PATENT DOCUMENTS

| | | |
|---|---|---|
| CN | 1989578 A | 6/2007 |
| CN | 101784137 A | 7/2010 |
| CN | 101839703 A | 9/2010 |
| CN | 102272566 A | 12/2011 |
| CN | 102314978 A | 1/2012 |
| CN | 202839176 U | 3/2013 |
| CN | 104838453 A | 8/2015 |
| DE | 3522427 C2 | 3/1989 |
| DE | 69822770 T2 | 8/2004 |
| DE | 3918818 B4 | 3/2006 |
| DE | 102015006057 A1 | 11/2016 |
| EP | 2620757 A1 | 7/2013 |
| GB | 2151398 A | 7/1985 |
| JP | H10270201 A | 10/1998 |
| JP | 2000169234 A | 6/2000 |
| JP | 3156593 B2 | 4/2001 |
| JP | 2015053358 A | 3/2015 |
| JP | 5884110 B2 | 3/2016 |
| WO | 03040676 A1 | 5/2003 |
| WO | 2009129930 A1 | 10/2009 |

OTHER PUBLICATIONS

Chung, G.S., "Micromachined Chromium Nitride Thin-Film Pressure Sensor for High Temperature Applications," Electronics Letters, Research Gate, vol. 42, No. 13, IEEE Xplore, Jul. 2006, 3 pages.

Eklund, P. et al., "The Mn + 1AXn phases: Materials science and thin-film processing" Thin Solid Films, vol. 518, Issue 8, Feb. 1, 2010, pp. 1851-1878.

Schultes, G. et al., "Pressure Sensors Based on Zirconia Ceramics and High Sensitivity Thin Films," Technical Measurement, vol. 83, Issue 3, 2016, 23 pages (with translation).

Nowotny, V.H., "Strukturchemie einiger Verbindungen der Übergangsmetalle mit den Elementen C, Si, Ge, Sn," Progress in Solid State Chemistry, vol. 5, 1971, 44 pages.

Phan, H.P. et al., "The Piezoresistive Effect of SiC for MEMS Sensors at High Temperatures: A Review," Journal of Microelectromechanical Systems, vol. 24, No. 6, Dec. 2015, 15 pages.

Pierson, H., "Handbook of Refractory Carbides and Nitrides, Properties, Characteristics, Processing and Applications," Noyes Publications, 1996, 360 pages.

Rölke, J., "Nichrome Thin Film Technology and its Application," Electrocomponent Science and Technology, vol. 9, 1981, 8 pages.

Wrbanek, J.D. et al., "Thin Film Ceramic Strain Sensor Development for High Temperature Environments," NASA/TM 2008-215256, TP975, 2008, 21 pages.

* cited by examiner

FILM RESISTOR AND THIN-FILM SENSOR

This patent application is a national phase filing under section 371 of PCT/EP2018/059433, filed Apr. 12, 2018, which claims the priority of German patent application 102017108582.3, filed Apr. 21, 2017, each of which is incorporated herein by reference in its entirety.

TECHNICAL FIELD

The present invention relates to a film resistor and to a thin-film sensor comprising the film resistor.

SUMMARY OF THE INVENTION

A film resistor may comprise a piezoresistive layer on which two electrodes are arranged. In a thin-film sensor the film resistor is applied to a membrane, which is fastened to a carrier body and which may vibrate relative to the carrier or may be bent relative to the carrier body.

To achieve a high measuring accuracy for the thin-film sensor, it is important to ensure that no mechanical stress arises between the film resistor and the membrane or the carrier during measurement. Mechanical stress could arise, for example, as a result of different coefficients of thermal expansion.

In addition, the film resistor needs to be highly sensitive, in order to enable high measuring accuracy, for example, when measuring pressure. In a piezoresistive sensor, sensitivity may be indicated as the k factor, which is also known as "gage factor." This describes the ratio between relative change in resistance ($\Delta R/R$) and relative change in length ($\Delta L/L$) of a piezoresistive layer. The k factor is defined as $$k=(\Delta R/R)/(\Delta L/L)$$

Here, R indicates the resistance of the piezoresistive layer, L the length of the piezoresistive layer and $\Delta R$ a change in resistance in the event of a change in length of $\Delta L$.

In a pressure sensor, the film resistor is conventionally exposed to cyclic bending stress. Accordingly, the film resistor may have a good mechanical stability. For this reason, the film resistor should preferably have a low modulus of elasticity.

Embodiments provide an improved film resistor. The film resistor should preferably meet the above-stated requirements. In addition, the film resistor should preferably be suitable for use in a high pressure range, for example, at pressures of up to woo bar, and in a high temperature range, for example, at temperatures of up to 300° C.

A film resistor is proposed which has a piezoresistive layer which comprises a $M_{1+n}AX_n$ phase, wherein M comprises at least one transition metal, A comprises a main-group element, X comprises carbon and/or nitrogen and wherein n=1, 2 or 3.

The $M_{1+n}AX_n$ phases crystallize in a hexagonal layer structure. They comprise $M_6X$ octahedra, which alternate with layers of the A atoms. There are 211 phases where n=1, 312 phases where n=2 and 413 phases where n=3, the A layers being separated by 2, 3 or 4 octahedron layers.

The $M_{1+n}AX_n$ phases have different characteristics, for which reason they are particularly well suited to use in a piezoresistive layer of a film resistor. The $M_{1+n}AX_n$ phases are metallically conductive and have high-temperature stability. Accordingly, they enable use of the film resistor at high temperatures.

Their coefficient of thermal expansion may be adapted by an appropriate selection of the materials of the $M_{1+n}AX_n$ phase to the coefficient of expansion of a membrane and a carrier body, such that, due to the matched coefficients of thermal expansion, no mechanical stresses arise even in the event of major changes in temperature. The temperature cross-sensitivity of the thin-film sensor may accordingly be reduced considerably. In this way, the service life of the thin-film sensor may be improved considerably, since the film resistor is not damaged, even after a large number of bending cycles.

The piezoresistive layer may either consist of the $M_{1+n}AX_n$ phase or comprise further components in addition to the MAX phase. The piezoresistive layer may, for example, comprise a mixture of the $M_{1+n}AX_n$ phase and an oxide, a nitride or a carbide.

The $M_{1+n}AX_n$ phase may either be a pure $M_{1+n}AX_n$ phase or a mixed crystal. In the case of a pure $M_{1+n}AX_n$ phase, M consists of a single transition metal and X consists either of carbon or of nitrogen. In the case of a mixed crystal $(M1,M2)_{1+n}AX_n$, M may be formed of two transition metals M1, M2. Alternatively or in addition, the component X may comprise both carbon and nitrogen, resulting in a mixed crystal with the composition $M_{1+n}A(C_yN_{1-y})_n$ and $0<y<1$. Mixed crystals $(M1,M2)_{1+n}A(C_yN_{1-y})_n$ are also possible in which M is formed of two transition metals M1, M2 and the component X may comprise both carbon and nitrogen.

Through the use of mixed crystals $(M1,M2)_{1+n}AX_n$, $M_{1+n}A(C_yN_{1-y})_n$ or $(M1,M2)_{1+n}A(C_yN_{1-y})_n$, the physical characteristics of the piezoresistive layer may be adjusted within wide ranges. Through the use of mixed crystals, it is, for example, possible to achieve greater hardnesses and lower conductivities for the piezoresistive layer than would be possible for a piezoresistive layer consisting of a pure $M_{1+n}AX_n$ phase. Characteristics of the piezoresistive layer which are essential to the use thereof in a thin-film sensor, such as, for example, the coefficient of thermal expansion, conductivity, piezoresistive effect and hardness of the layer may be adjusted as desired.

M may comprise at least one of Sc, Ti, V, Cr, Mn, Zr, Nb, Mo, Hf and Ta. A may be one of Al, Si, P, S, Ga, Ge, As, Cd, In, Sn, Tl, Pb and Bi.

The piezoresistive layer may consist of the $M_{1+n}AX_n$ phase. Accordingly, the piezoresistive layer may not have any further components in addition to the $M_{1+n}AX_n$ phase.

Alternatively, the piezoresistive layer may comprise an oxide, a nitride or a carbide in addition to the $M_{1+n}AX_n$ phase. In this case, the $M_{1+n}AX_n$ phase may combine with the oxide, nitride or carbide to form a solid-state mixture. A solid-state mixture from the $M_{1+n}AX_n$ phase with one of oxides, nitrides or carbides may be advantageous with regard to reducing the conductivity of the piezoresistive layer relative to a pure $M_{1+n}AX_n$ phase and increasing the piezoresistive effect. In addition, the coefficient of thermal expansion may be influenced as desired by the composition of the layer.

The $M_{1+n}AX_n$ phase which, together with the oxide, the nitride or the carbide, forms a solid-state mixture, may be a pure $M_{1+n}AX_n$ phase or a mixed crystal $(M1,M2)_{1+n}AX_n$, $M_{1+n}A(C_yN_{1-y})_n$ or $(M1,M2)_{1+n}A(C_yN_{1-y})_n$.

If the piezoresistive layer consists of an $M_{1+n}AX_n$ phase and an oxide, the oxide may be present at least in part as a surface oxide of the piezoresistive layer. The oxide may form stable surface oxides on the grains of an $M_{1+n}AX_n$ phase. Through the formation of stable surface oxides, the resistance value of the layer may be increased and the piezoresistive effect optimized, for example, with tunnel effects occurring at the oxidic grain boundary barriers.

The piezoresistive layer may have a coefficient of thermal expansion of between 8 ppm/K and 14 ppm/K. The coefficient of thermal expansion is preferably between 9 ppm/K and 12 ppm/K. These coefficients of expansion correspond to the coefficients of thermal expansion of the materials which are conventionally used for a membrane and a carrier body on which the film resistor is arranged. Through adaptation of the coefficient of thermal expansion of the film resistor to the coefficient of thermal expansion of the membrane and of the carrier body, it is possible to prevent mechanical stress from arising in the event of changes in temperature.

The piezoresistive layer may have a specific resistance of greater than 1 μΩ/m at a temperature of 20° C. Accordingly, the piezoresistive layer may have a high sensitivity combined with low noise at room temperature.

The piezoresistive layer may have a k factor which is greater than 2. The k factor indicates the ratio of a relative change in resistance ($\Delta R/R$) to a relative change in length ($\Delta L/L$) of the piezoresistive layer. A k factor which is greater than 2 is synonymous with high piezoresistive layer sensitivity.

Further embodiments relates to a thin-film sensor comprising the above-described film resistor.

The thin-film sensor may comprise a membrane, on which the film resistor is arranged, and a carrier body, to which the membrane is fastened in such a way that the membrane can move relative to the carrier body. The membrane may in particular be configured to vibrate relative to the body and/or to be bent relative to the carrier body.

The thin-film sensor may comprise a plurality of the above-described film resistors, connected to one another to form a bridge circuit in the form of a full bridge or a half bridge. The film resistors may be configured at least in part as bridges or half bridges.

For the purpose of measuring a temperature, one of the film resistors may be arranged in a region of the carrier body or the membrane which undergoes less deformation than other regions of the carrier body or the membrane. The region in which the film resistor is arranged for measuring a temperature preferably undergoes only slight bending.

The membrane and the carrier body may comprise stainless steel or yttrium-stabilized zirconium. The piezoresistive layer may be configured in such a way that its coefficient of thermal expansion is identical to the coefficients of thermal expansion of these materials or at least deviates only slightly from the coefficients of thermal expansion of these materials. Since the piezoresistive layer comprises an $M_{1+n}AX_n$ phase, it is possible to configure the piezoresistive layer in such a way that its coefficient of thermal expansion is adapted to the materials of the membrane and of the carrier body.

Alternatively, the membrane and the carrier body may consist of an $M_{1+n}AX_n$ phase, wherein M comprises at least one transition metal, A comprises a main-group element, and X comprises carbon and/or nitrogen, and wherein n=1, 2 or 3. In this case, it may be the same $M_{1+n}AX_n$ phase as also comprises the piezoresistive layer. Alternatively, it may be an $M_{1+n}AX_n$ phase which differs from the $M_{1+n}AX_n$ phase of the piezoresistive layer. The thin-film sensor may moreover comprise an insulator which insulates the piezoresistive layer from the carrier body and the membrane. If the piezoresistive layer and the membrane and the carrier body comprise the same material, the likelihood of mechanical stress arising due to different coefficients of thermal expansion is ruled out. It this way, it is possible to ensure a long service life for the thin-film sensor. The insulator may prevent current from flowing from the piezoresistive layer to the membrane. Even if the $M_{1+n}AX_n$ phase comprised by the membrane and the carrier body or the piezoresistive layer differ from one another, their coefficients of thermal expansion are very similar to one another.

BRIEF DESCRIPTION OF THE DRAWINGS

The present invention is explained below on the basis of the appended figures.

DETAILED DESCRIPTION OF ILLUSTRATIVE EMBODIMENTS

Figure 1:
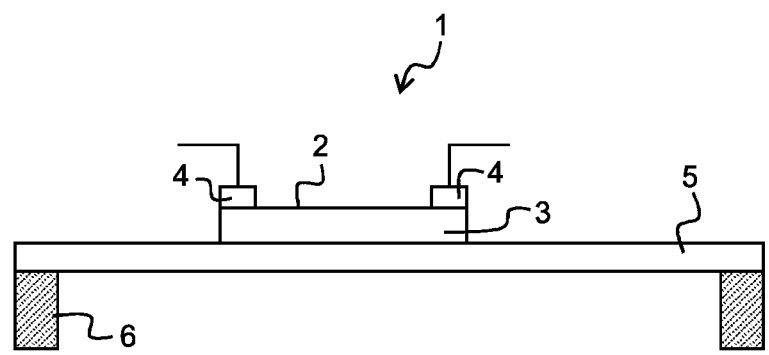
FIG. 1 shows a thin-film sensor according to a first exemplary embodiment.

FIG. 1 shows a thin-film sensor 1 comprising a film resistor 2 with a piezoresistive layer 3. The film resistor 2 further comprises two electrodes 4. The electrodes 4 are arranged at opposite ends of the piezoresistive layer 3.

The thin-film sensor 1 comprises a membrane 5 and a carrier body 6. The membrane 5 is fastened to the carrier body 6 in such a way that the membrane 5 may move relative to the carrier body 6. In particular, the membrane 5 may vibrate relative to the body 6. In this case, a central area of the membrane 5 may be bent. The film resistor 2 is arranged on the membrane 5. The piezoresistive layer 3 may to this end be deposited directly on the membrane 5. In particular, the film resistor 2 is arranged in the region of the membrane 5 which is mobile relative to the carrier body 6.

If the membrane 5 then deforms as a consequence of pressure exerted thereon, this leads to deformation of the piezoresistive layer 3. In this case, the piezoelectric effect results in an electrical signal which may be detected by the electrodes 4.

The thin-film sensor 1 preferably comprises four film resistors 2, which are interconnected to yield an electrical resistance bridge. The resistance bridge is preferably a Wheatstone bridge. On the basis of electrical signals detected by these film resistors 2, a pressure exerted on the thin-film sensor 1 may be calculated.

The thin-film sensor 1 described here is suitable not only for measuring a pressure but also for measuring forces and for measuring elongation of the membrane 5.

The piezoresistive layer 3 may comprise an $M_{1+n}AX_n$ phase. In this case, the piezoresistive layer 3 may comprise a pure $M_{1+n}AX_n$ phase or mixed phases $(M1,M2)_{1+n}AX_n$, $M_{1+n}A(C_yN_{1-y})_n$ or $(M1,M2)_{1+n}A(C_yN_{1-y})_n$. The piezoresistive layer 3 may either consist of the $M_{1+n}AX_n$ phase or comprise a mixture of the $M_{1+n}AX_n$ phase with an oxide, a nitride or a carbide.

The membrane 5 and the carrier body 6 may comprise stainless steel or yttrium-stabilized zirconium. The piezoresistive layer 3 comprises a coefficient of thermal expansion which differs only slightly from the coefficients of thermal expansion of the membrane 5 and of the carrier body 6. Alternatively, the membrane 5 and the carrier body 6 may also comprise a ceramic material or a metal or consist of the ceramic material or the metal.

The piezoresistive layer 3 shown in FIG. 1 is cuboidal. Alternatively, the piezoresistive layer 3 may be meandershaped. A meander shape has the advantage over a cuboidal shape of greater length between the two electrodes 4 while occupying the same volume.

Figure 2:
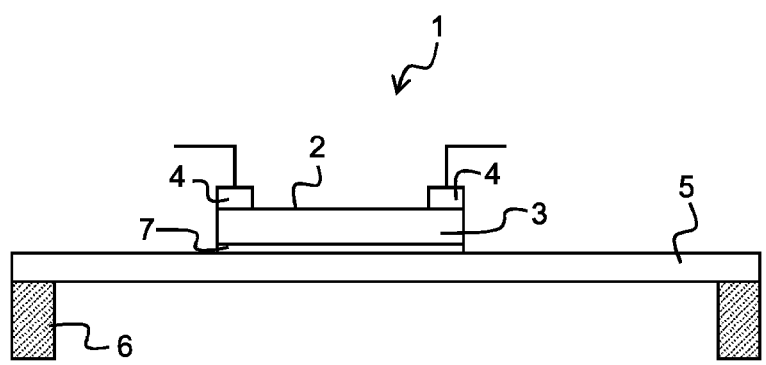
FIG. 2 shows a thin-film sensor according to a second exemplary embodiment.

FIG. 2 shows a second exemplary embodiment of the thin-film sensor 1. Here, the membrane 5 and the carrier body 6 consist of the same material as the piezoresistive layer 3. To prevent electrical short circuits between the membrane 5 and the piezoresistive layer 3, an insulator 7 is additionally arranged between the piezoresistive layer 3 and the membrane 5. The insulator 7 is a layer consisting of a non-conductive material.

Figure 3:
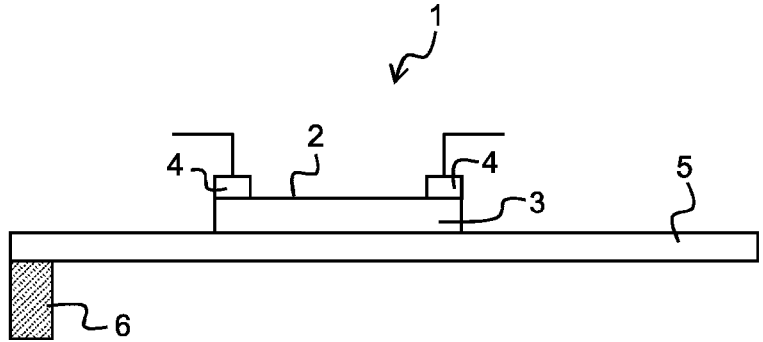
FIG. 3 shows a thin-film sensor according to a third exemplary embodiment.

FIG. 3 shows a third exemplary embodiment, in which the membrane 5 is fastened to the carrier body 6 only on one side. The membrane 5 may accordingly be bent relative to the carrier body 6.

The invention claimed is:

1. A film resistor comprising:
   a piezoresistive layer comprising a $M_{1+n}AX_n$ phase,
   wherein M comprises at least one transition metal, A comprises a main-group element, and X comprises carbon and/or nitrogen, and
   wherein n=1, 2 or 3.

2. The film resistor according to claim 1, wherein M comprises a single transition metal or two transition metals M1, M2.

3. The film resistor according to claim 1,
   wherein M comprises at least one of Sc, Ti, V, Cr, Mn, Zr, Nb, Mo, Hf or Ta, and
   wherein A is one of Al, Si, P, S, Ga, Ge, As, Cd, In, Sn, Tl, Pb or Bi.

4. The film resistor according to claim 1, wherein the piezoresistive layer consists essentially of the $M_{1+n}AX_n$ phase.

5. The film resistor according to claim 1, wherein the piezoresistive layer comprises an oxide, a nitride or a carbide.

6. The film resistor according to claim 5, wherein the oxide is present at least in part as a surface oxide of the piezoresistive layer.

7. The film resistor according to claim 1, wherein the piezoresistive layer has a coefficient of thermal expansion of between 8 ppm/K and 14 ppm/K inclusive.

8. The film resistor according to claim 1, wherein the piezoresistive layer has a specific resistance of greater than 1 µΩ/m at a temperature of 20° C.

9. The film resistor according to claim 1, wherein the piezoresistive layer has a k factor, which indicates a ratio of a relative change in resistance (ΔR/R) to a relative change in length (ΔL/L) of the piezoresistive layer, of greater than 2.

10. A thin-film sensor comprising:
    the film resistor according to claim 1.

11. The thin-film sensor according to claim 10, further comprising:
    a membrane, on which the film resistor is arranged; and
    a carrier body, to which the membrane is fastened such that the membrane is movable relative to the carrier body.

12. The thin-film sensor according to claim 11, wherein one of the film resistors is arranged in a region of the carrier body or the membrane which undergoes less deformation than other regions of the carrier body or the membrane, and wherein this film resistor is configured to measure temperature.

13. The thin-film sensor according to claim 11, wherein the membrane and the carrier body comprise stainless steel or yttrium-stabilized zirconium.

14. The thin-film sensor according to claim 11, wherein the membrane and the carrier body consist essentially of an $M_{1+n}AX_n$ phase, wherein M comprises at least one transition metal, A comprises a main-group element, X comprises carbon and/or nitrogen, wherein n=1, 2 or 3, and wherein the thin-film sensor comprises an insulator which insulates the piezoresistive layer from the carrier body and the membrane.

15. The thin-film sensor according to claim 10, wherein the thin-film sensor comprises a plurality of film resistors, which are connected to form a bridge circuit in the form of a full bridge or a half bridge.

* * * * *